July 20, 1965 R. T. BURNETT 3,195,360
BOOT CONSTRUCTION
Filed Oct. 4, 1962
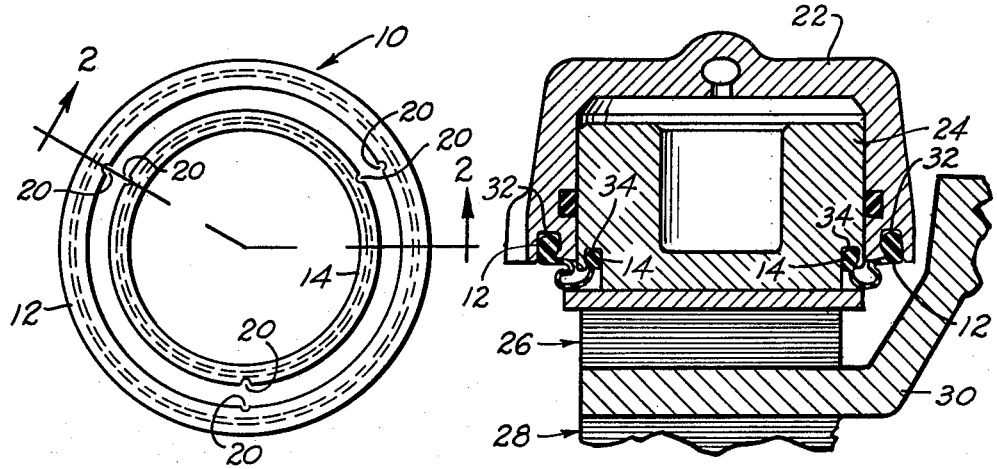
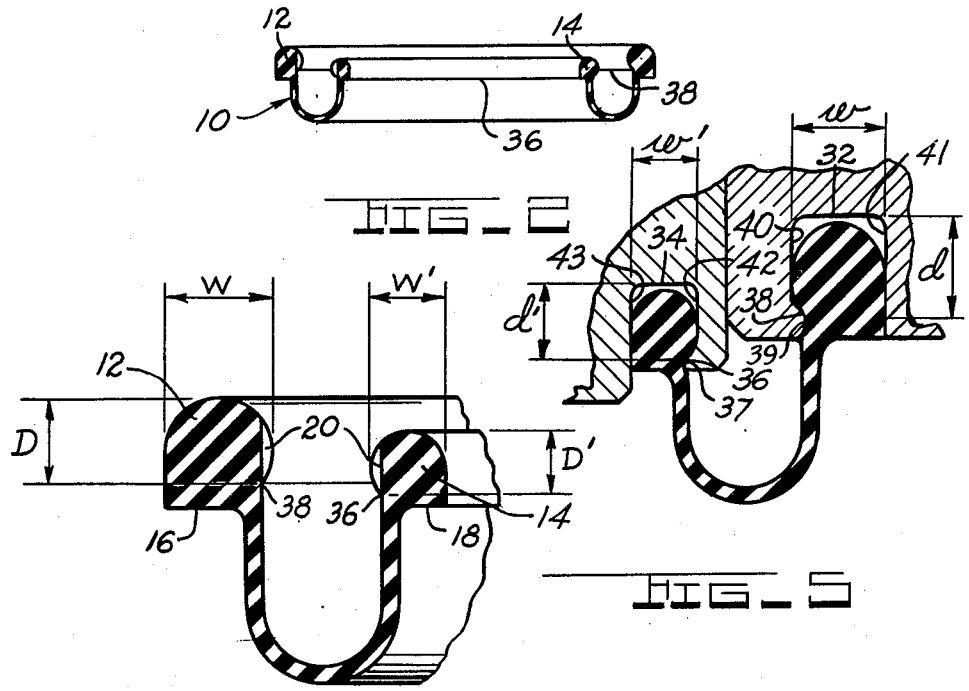
INVENTOR.
RICHARD T. BURNETT.
BY
Sheldon F. Raizes
ATTORNEY.

United States Patent Office 3,195,360
Patented July 20, 1965

3,195,360
BOOT CONSTRUCTION
Richard T. Burnett, South Bend, Ind., assignor to The Bendix Corporation, South Bend, Ind., a corporation of Delaware
Filed Oct. 4, 1962, Ser. No. 228,345
8 Claims. (Cl. 74—18.2)

This invention relates to a boot for providing a seal between two relatively movable members.

A well known construction for sealing a bore, in which a member is movable, from outside contaminants is the insertion of one peripheral edge of a boot in a groove in the movable member and the insertion of its other peripheral edge in a groove of the bore housing. The grooves extend transverse to the axis of the bore and therefore necessitate stretching of the peripheral edges of the boot over a larger edge of the movable member and the housing before the boot edges can be inserted into their respective grooves. Such a method of fastening the boot to the movable member and bore housing is cumbersome and time consuming.

Accordingly, it is an object of this invention to provide a boot connection to a movable member and bore housing for the purpose of assembling the boot thereto with the minimum of effort and time.

Another object of this invention is to provide a boot connection to a movable member and bore housing for the purpose of assembling the boot thereto by applying pressure in a direction substantially parallel to the bore axis.

Still another object of the invention is to provide a simple boot connection to a movable member and bore housing which is efficient for keeping out contaminants.

A further object of the invention is to provide a simple boot construction which eliminates trapped air in the grooves during assembly of the boot edges into the grooves.

Other objects will become apparent to those skilled in the art from the following description of an embodiment depicted in the accompanying drawings for illustrative purposes only wherein:

FIGURE 1 is a plan view of a boot;
FIGURE 2 is a view taken along section line 2—2 of FIGURE 1;
FIGURE 3 is an enlarged partial view of FIGURE 2;
FIGURE 4 is a section view of a partial disk brake assembly; and
FIGURE 5 is an enlarged partial view of FIGURE 4.

Referring first to FIGURES 1-2, there is illustrated a rubber or resilient boot 10 having a pair of annular beads 12, 14 at its peripheral edges. The bottom surfaces 16 and 18 of the beads 12 and 14, respectively, are flat and each bead has notches or grooves 20 for purposes to be described hereinafter.

Referring to FIGURE 4, the invention is shown associated with a caliper type disk brake of which only one side is illustrated. A cylinder housing 22 has a piston 24 slidable therein and a pair of brake shoes 26 and 28 on opposite sides of a rotor 30. While the caliper is shown only on one side of the rotor for simplicity, it should be understood that the same or any other well known configuration could be utilized on the other side of the rotor.

The cylinder housing 22 and piston 24 each have undercut grooves 32 and 34, respectively, for receiving the boot beads 12 and 14, respectively. The boot beads 12, 14 are inserted within the undercut grooves 32, 34 by a tool having flat edges which engage the flat surfaces 16 and 18 of the beads for exerting axial pressure on the beads. Axial pressure exerted on the flat surface of each bead compresses the width of the beads and elongates the depth thereof to squeeze the beads past the necks of their respective undercut grooves 32, 34. The width w and w' of each groove is slightly less than the width W and W' of their respective uncompressed boot bead and the depth d and d' of each groove is slightly greater than the depth D and D' of their respective uncompressed boot bead. This relationship of each bead to its respective groove permits each bead to be compressed in width and gives room within the groove for the simultaneous elongation of depth of each bead until the neck 36 and 38 of the beads passes the neck 37 and 39 of the grooves at which time the beads tend to resume its prior uncompressed configuration by expanding in width until it engages the sidewalls 40, 41 of groove 32 and sidewalls 42 and 43 of groove 34.

When the beads are retained in the grooves, they will be compressed against the sidewalls of their respective grooves and slightly elongated since the width of the boot beads is greater than the width of their respective groove. Since the boot beads are compressed against the sidewalls of their respective grooves, the beads will provide a very effective seal against contaminants especially moisture.

It will also be noted that as the beads are forced into their respective grooves, air trapped in the grooves by the beads can escape from the grooves through the notches or grooves 20. Obviously, the grooves 20 could be placed on either the inner or outer diameter of each bead.

While the invention has been described in considerable detail, I do not wish to be limited to the specific construction shown and described; and it is my intention to cover hereby all novel adaptations, modifications and arrangements thereof which come within the practice of those skilled in the art to which the invention relates.

I claim:

1. The combination of a housing member having a bore therein opening into a face of said housing member and a movable member slidable within said bore comprising: said movable member having an outer face transverse to the axis of said bore, a resilient boot having an annular bead defining one peripheral edge connected to one of said members and having a second peripheral edge connected to the other of said members, said one member having an annular groove in its respective face receiving said bead therein, said bead being compressed between the sidewalls of said groove, one surface of said bead engaging the sidewalls of said groove having notch means therein communicating the bottom of said groove with the exterior thereof to eliminate trapped air in said groove, said one surface of said bead being located closer to the wall of the bore than the other surface which also engages a sidewall of said groove.

2. The structure as recited in claim 1 wherein the surface of said bead facing away from said housing and movable member faces are flat and in a plane generally parallel to the planes of said faces.

3. The structure as recited in claim 1 wherein said groove is undercut.

4. The structuer as recited in claim 3 wherein a space is between the bottom of said bead and the bottom of said groove.

5. In a disk brake: a housing having a bore opening into a face of said housing, a piston slidable within said bore, said piston having an outer face transverse to the axis of said bore, an annular groove in said piston face, an annular groove in said face surrounding said bore, a resilient boot having an annular bead defining one peripheral edge inserted within one of said grooves and an annular bead defining its other peripheral edge inserted within the other groove, said beads being compressed against the sidewalls of their respective groove, one of the surfaces of each bead engaging the sidewall of their respective grooves having notch means therein communicating the bottom of the groove with the exterior thereof to eliminate trapped air, said one surface of each bead being located closer to the wall of the bore than the other surface which also engages a sidewall of its respective groove.

6. The structure as recited in claim 5 wherein the surface of each said bead facing away from said housing and piston faces are flat and in planes generally parallel to the planes of said faces.

7. The structure as recited in claim 5 wherein said grooves are undercut.

8. The structure as recited in claim 7 wherein a space is between the bottom of each said bead and the bottom of their respective groove.

References Cited by the Examiner

UNITED STATES PATENTS 2,885,227  5/59  Burger _____ 277—9

FOREIGN PATENTS 806,080  6/51  Germany.

BROUGHTON G. DURHAM, *Primary Examiner.*